United States Patent

Wright et al.

[11] Patent Number: 6,066,905
[45] Date of Patent: May 23, 2000

[54] DYNAMOELECTRIC MACHINE: QUADRATURE WINDING RETENTION APPARATUS

[75] Inventors: Kamron M. Wright, Fort Wayne, Ind.; David T. Molnar, Cuyahoga Falls, Ohio

[73] Assignee: General Electric Company, Schenectady, N.Y.

[21] Appl. No.: 08/964,578

[22] Filed: Nov. 5, 1997

[51] Int. Cl.[7] .......................... H02K 29/06; H02K 29/12; H02K 3/50
[52] U.S. Cl. .......................... 310/179; 310/260; 310/184; 310/68 B; 310/194
[58] Field of Search .................................. 310/260, 184, 310/68 B, 194, 179, 111, 214, 187, 42, 71; 324/207.25; 29/596, 606, 605

[56] References Cited

U.S. PATENT DOCUMENTS

| | | | |
|---|---|---|---|
| 2,894,157 | 7/1959 | Morrill | 310/179 |
| 3,780,323 | 12/1973 | Swain | 310/43 |
| 4,340,829 | 7/1982 | McCoy | 310/71 |
| 4,386,288 | 5/1983 | Laurie | 310/49 R |
| 5,355,041 | 10/1994 | Shirao et al. | 310/90.5 |
| 5,796,194 | 8/1998 | Archer et al. | 310/68 B |

FOREIGN PATENT DOCUMENTS 5-03454  4/1993  Japan .................................. 310/68 D Primary Examiner—Thomas M. Dougherty
Assistant Examiner—Karl Eizo Tamai
Attorney, Agent, or Firm—Senniger, Powers, Leavitt & Roedel; Damian Wasserbauer

[57] ABSTRACT

A dynamoelectric machine having a wire retaining device constructed to frictionally retain the quadrature winding to allow automated winding of the quadrature winding. The wire retaining device includes stator end caps having integrally formed wire retention elements at the radially inner end of the stator tooth. The wire retaining device frictionally holds the wire in place as the quadrature winding is automatically wound about the stator. In addition, the stator end caps electrically insulate the quadrature winding from the stator and the main winding.

12 Claims, 4 Drawing Sheets

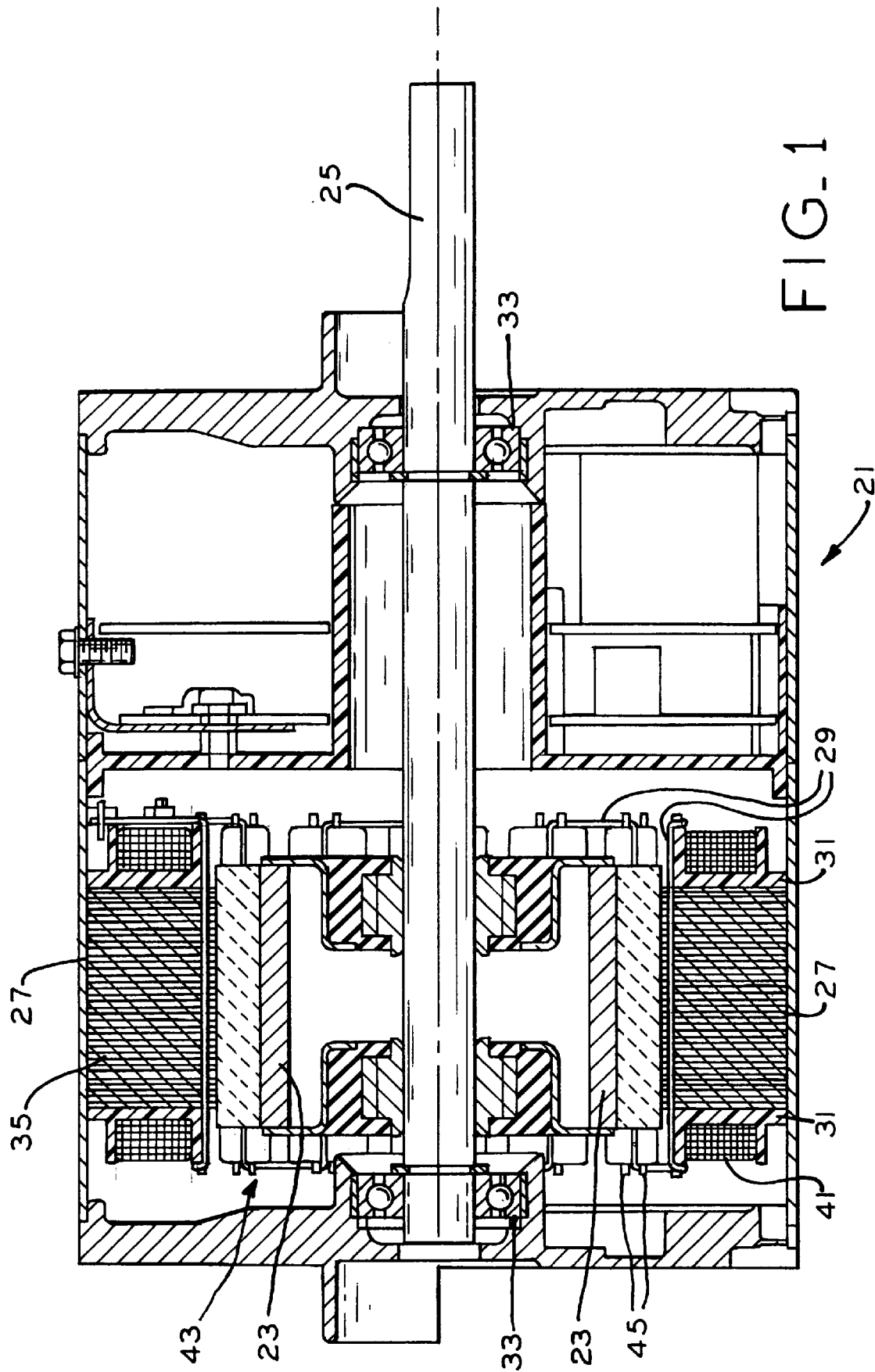
FIG._1

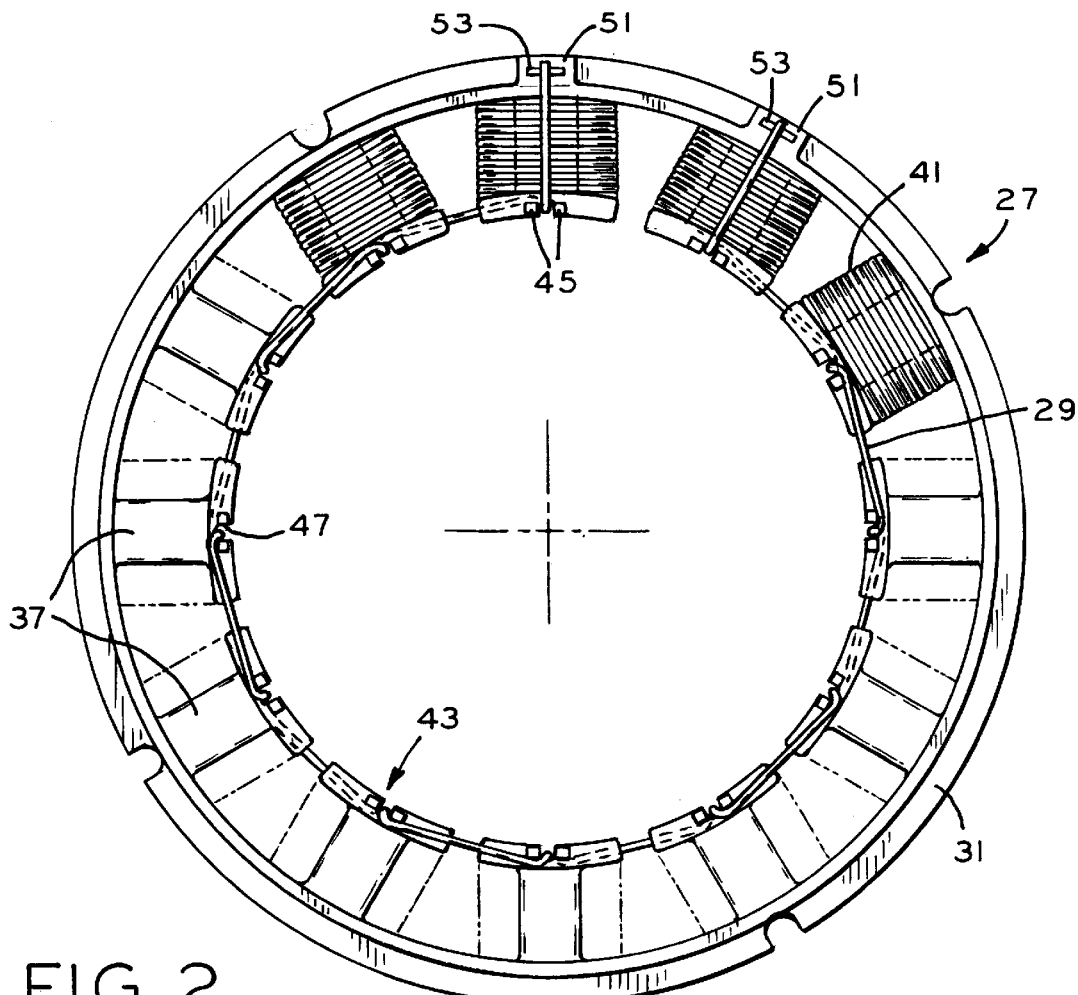
FIG_2
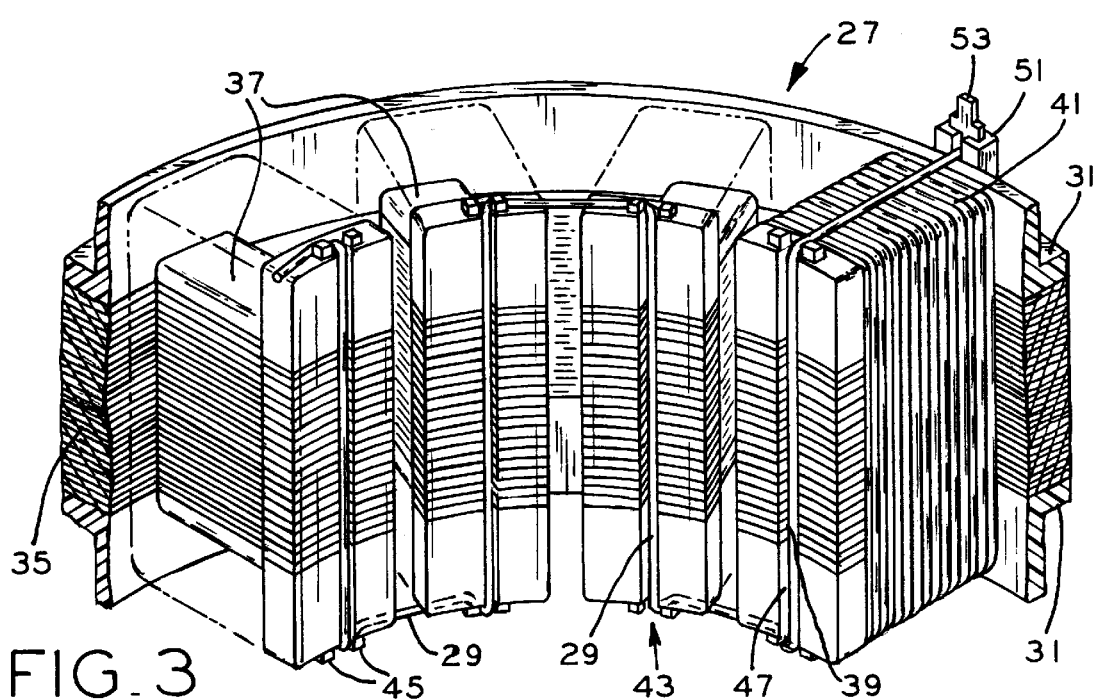
FIG_3

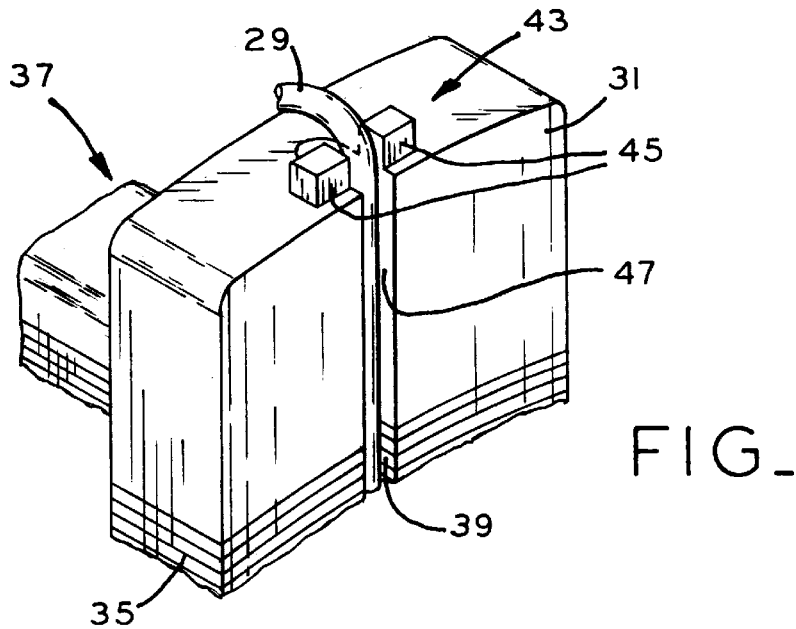
FIG_4
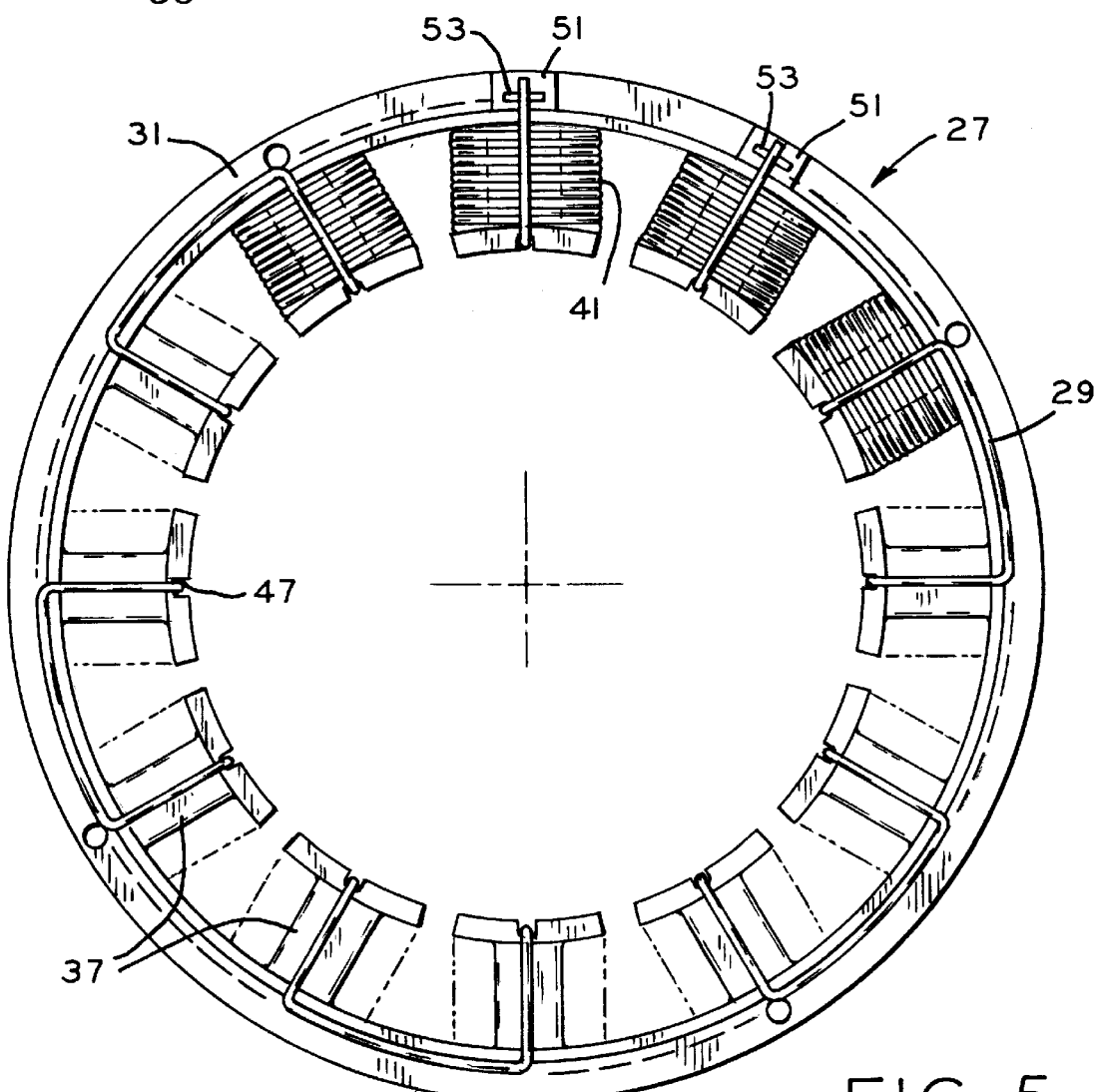
FIG_5

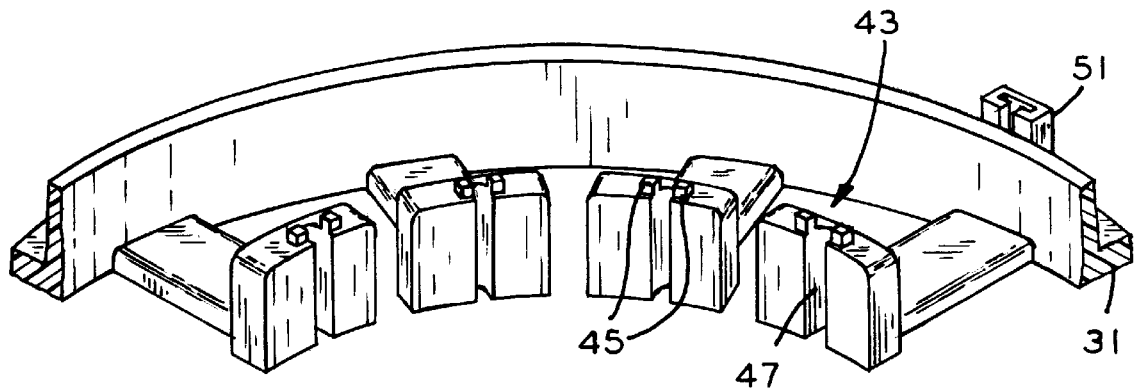
FIG_6
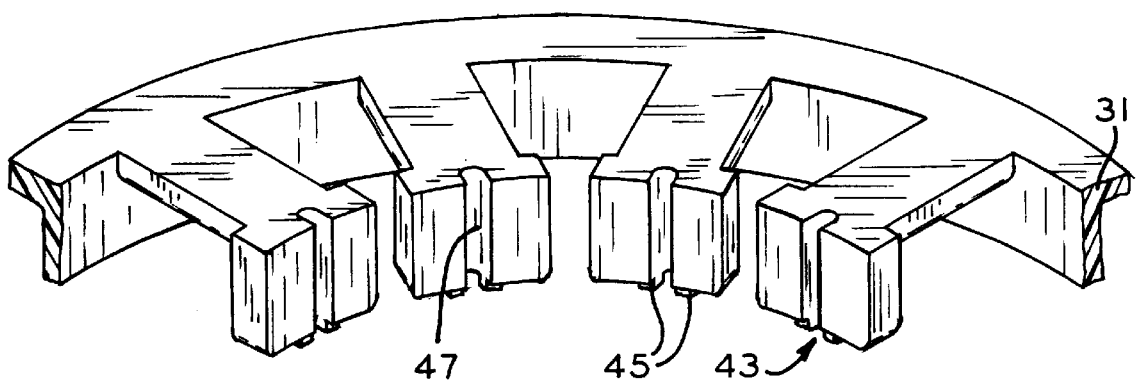
FIG_7

DYNAMOELECTRIC MACHINE: QUADRATURE WINDING RETENTION APPARATUS

BACKGROUND OF THE INVENTION

This invention relates generally to dynamoelectric machines and more particularly to a quadrature winding retention apparatus for a dynamoelectric machine.

Dynamoelectric machines, in the form of electric motors, have numerous applications, such as for an air handler, washing machine and compressor motors. An important part of the utility of such motors is the ease of manufacturability. Manufacturers require inexpensive, yet reliable and efficient motors for appliances or other tightly packaged machines. Thus, manufacturers see a need for a motor that can be rapidly and economically manufactured without sacrificing package space, manufacturing cost efficiency, and operating cost efficiency.

Dynamoelectric machines also need to be commutated such that the controller alternates the direction of the electrical current inducing rotor rotation when the back electromotive force and motor current are at the proper phase relationship. This ensures that the machine does not waste electrical energy by switching the current direction too early or too late and working against the momentum of the motor. To commutate a dynamoelectric motor properly, accurate rotor position information is essential and readily available through various rotor position sensors. Without information from position sensors, electronically commutated dynamoelectric motors will not operate.

Quadrature winding technology offers a promising, low cost alternative to a Hall Effect sensor. Quadrature windings sense rotor position for commutation, but are more appealing than Hall Effect sensors because they provide more accurate information and can be added to a sealed motor system with a minimal number of wiring leads and connectors.

A quadrature winding comprises a single insulated conductor oriented in a channel in the center of the radially inner end of a stator tooth, wound to an adjacent tooth end, and oriented again in a center channel of the adjacent stator tooth end. Channels are added to the stator tooth ends to keep the rotor from striking the conductor and to minimize the gap size caused by sensing devices between the stator and rotor. In the past, production motor designs did not incorporate quadrature winding technology because of poor manufacturability and high labor costs. Operators experience difficulty hand winding the quadrature because the wire required constant tension while wound to ensure that the previous windings did not loosen. Hand winding was unattractive for production motors because automated winding techniques yield faster, less expensive, and more accurate results.

SUMMARY OF THE INVENTION

Among the several objects and features of the present invention may be the provision of a dynamoelectric machine in which wire retention means are readily employed; the provision of such a dynamoelectric machine that securely retains quadrature windings to the stator core during winding; the provision of such a dynamoelectric machine where said wire retention means allow for automated winding of the quadrature winding; the provision of such a dynamoelectric machine in which stator end caps form the wire retaining means; the provision of such a dynamoelectric machine that retains stator end caps for electrically insulating the quadrature winding from the main winding.

Generally, a dynamoelectric machine of the present invention comprises a rotor including at least one permanent magnet. A stator includes a stator core having a central opening in which the rotor is received. The stator core has teeth extending radially inwardly into the central opening, and a winding wound around at least some teeth of the stator core. A quadrature winding is positioned for generating an output signal representative of the rotor angular position. The quadrature winding includes wire extending longitudinally of the stator core along radially inner ends of at least some stator teeth. Wire retaining means associated with at least some stator teeth are disposed for receiving and fixedly retaining the quadrature winding to secure the quadrature winding on the stator core.

In another aspect of the present invention, a dynamoelectric machine has a stator core, rotor and windings generally as set forth above. A stator end cap to retain a quadrature winding for detecting the rotational position of a permanent magnet rotor located within a stator core of the dynamoelectric machine. Said stator end cap comprises an outer ring portion having an outer diameter corresponding to an outer diameter of the stator core, an inner diameter and a central opening. Said stator end cap comprises teeth projecting from the inner diameter of the ring portion radially inwardly into the central opening of the end cap. Said stator end cap comprises wire retaining means located generally at radially inner ends of at least some teeth for receiving and fixedly retaining the quadrature winding wire forming the quadrature winding.

In still another aspect of the general invention, a method of winding a quadrature winding on a stator core of a stator for forming a dynamoelectric machine is provided. The quadrature winding detects the position of a permanent magnet rotor to be disposed in the stator core. The method comprises the following steps: passing the quadrature winding wire longitudinally through a central opening of the stator core generally along a radially inner end of a first tooth of the stator core; snapping the wire into wire retaining means disposed at a first end of the stator core generally at the radially inner end of the first tooth such that said wire retaining means fixedly hold the wire on the stator core; repositioning, by relative movement between the wire and the stator core, the wire to a second tooth of the stator core; snapping the wire into wire retaining means disposed at the first end of the stator core generally at the radially inner end of the second tooth; passing the wire longitudinally through the central opening of the stator core generally along a radially inner end of the second tooth; and snapping the wire into wire retaining means disposed at a second end of the stator core generally at the radially inner end of the second tooth such that said wire retaining means fixedly hold the wire on the stator core.

Other objects and features of the present invention will be in part apparent and in part pointed out hereinafter.

BRIEF DESCRIPTION OF THE DRAWINGS

FIG. 1 is a top cross sectional view of an electric motor with a quadrature winding and wire retaining means;

FIG. 2 is an end elevational view of a stator with wire a retaining means;

FIG. 3 is a fragmentary perspective view of the stator with wire retaining means;

FIG. 4 is a fragmentary perspective view of a single stator tooth with wire retaining means.

FIG. 5 is an end elevational view of the stator with a wire retaining means and an alternate winding configuration.

FIG. 6 is a fragmentary perspective view of the upper motor end cap.

FIG. 7 is a fragmentary perspective view of the lower motor end cap.

Corresponding reference characters indicate corresponding parts throughout the several views of the drawings.

DETAILED DESCRIPTION OF THE PREFERRED EMBODIMENTS

Referring now to the drawings, and more particularly to FIG. 1, apparatus of the present invention for retaining a quadrature winding in a dynamoelectric machine is indicated in its entirety by the reference numeral 21. The dynamoelectric machine comprises a rotor, generally indicated at 23, a shaft 25, a stator, generally indicated at 27, a quadrature winding 29, and stator end caps 31 functioning as wire retaining means.

The rotor 23 is generally cylindrical in shape and comprises a sequential array of permanent magnets spaced equidistant about the circumference of the rotor. The permanent magnets are magnetized in alternate magnetic orientations. The permanent magnets are arranged such that the polarity of the radially outward portion of each magnet is either north or south polarity. The rotor 23 mounts centrally to a rotatable shaft 25. The shaft 25 and the rotor 23 share the same central, longitudinal axis. The shaft 25 rotates within two bearing assemblies 33 located on the top and bottom of the dynamoelectric machine 21.

Referring now to FIGS. 2–5, the stator 27 is generally cylindrical in shape having a central cylindrical opening for receiving the rotor 23 and shaft 25 assembly. The stator 27 is formed of several horizontal layers 35 of ferromagnetic material. The layers 35 are identical in shape and when placed against the face of each other, form the body of the stator 27. The stator 27 body has teeth 37 extending radially inward from radially outer portions of the stator core. The teeth 37 are located at regular angular intervals along the circumference of the stator 27.

Channels 39 are formed at the radially inner portion of the stator teeth 37. The channels 39 run longitudinally from the top to the bottom of each tooth 37 along its center. The channel allows the quadrature winding 29 to pass down the front of each tooth 37 set back from the radially inner surface of the tooth such that the quadrature winding does not decrease the clearance between the rotor 23 and the stator 27. Adequate spacing between adjacent teeth 37 allows the main winding 41 of the dynamoelectric machine 21 to wind several times around each stator tooth. When charged with alternating electrical current, this main winding 41 induces rotation of the rotor 23 relative to the stator 27.

The main winding 41 comprises a single wire strand wound repeatedly around each stator tooth 37 and then passed to the adjacent stator tooth for winding in the opposite direction. The main winding 41 carries an alternating current along its length, creates magnetic fields between each pair of stator teeth, and thereby induces the rotation of the rotor 23. The main winding 41 is wound around the stator teeth 37 before the routing of the quadrature winding 29 about the stator. However, it is envisioned that the quadrature axis winding 29 may be wound on the stator prior to the main winding 41.

The quadrature winding 29 comprises a single insulated conductor through which current passes. The rotation of the rotor 23 induces a current in the quadrature winding 29. As the alternating magnetic fields of the rotor 23 magnets pass the quadrature winding 29, the moving magnetic fields generate current perpendicular to the magnetic field, or parallel to the quadrature winding. Because the polarity of the rotor 23 magnet seen by each tooth alternates between north and south proportional to rotor rotation, the position of the rotor can be calculated from the induced alternating current within the quadrature winding 29.

The quadrature winding 29 passes through the center channel 39 of a radially inner portion of each stator tooth 37. The main winding 41 and quadrature winding 29 are electrically insulated from one another so that the current in the quadrature winding 29 represents only rotor position. The rotating rotor 23 creates an array of moving electromagnetic fields as it passes each segment of the quadrature winding 29. These electromagnetic fields induce the current within the quadrature winding 29. By monitoring the current, rotor 23 angular position is calculated.

From one stator tooth 37 to the next adjacent tooth, the quadrature winding 29 can follow two prescribed paths. Referring now to FIGS. 2–3, in a first embodiment, the quadrature winding 29 passes directly from the top radially inner end of one stator tooth 37 to the top radially inner end of an adjacent stator tooth. The quadrature winding 29 then passes down the radially inner end to the bottom of the stator tooth 37 where it passes directly to the bottom radially inner end of the next stator tooth. This winding pattern continues around the entire inner circumference of the stator 27.

Referring now to FIG. 5, in a second embodiment, the quadrature winding 29 is wound from one stator tooth 37 to an adjacent tooth by traveling radially outwardly along the top of the tooth to the radially outer portion of the stator 27. The quadrature winding 29 then travels along the outer circumference of the stator 27 to the next tooth 37 position. Finally, the quadrature winding 29 runs radially inwardly along the top of the tooth 37 to the inner tooth end where the quadrature winding passes into the center channel 39 of the stator tooth. This path is then repeated along the bottom portion of the next adjacent stator tooth 37. This winding pattern continues around the entire circumference of the stator 27. In either winding pattern of the quadrature winding 29, the terminal ends of the winding are received in terminal fixtures 51 capable of receiving an insulation penetrating connectors 53 for use in connecting the quadrature winding to a motor control (not shown). However, it is envisioned that the terminal ends of the quadrature winding 29 could be placed together with the terminal ends of the main winding 41 in a harness (not shown) for connection to the control.

Referring now to FIGS. 6–7, before the routing of either the main winding 41 or quadrature winding 29 about the stator 27, a stator end cap 31 is affixed to the top and bottom of the stator. The stator end caps 31 facilitate the anchoring of the quadrature winding 29 to the stator 27 and the insulation of the quadrature winding from the stator. The stator end cap 31 comprises wire retaining means 43 that receive and fixedly retain the quadrature winding 29 at the radially inner end of each tooth 37. Because both longitudinal ends of the stator 27 have an end cap 31 and corresponding retention means, the quadrature winding 29 is held fixedly when passing through the channel 39 in the stator tooth 37.

The wire retention means 43 comprise nubs 45 spaced apart a distance less than the quadrature winding 29 diameter. The nubs 45 are sized and shaped for frictional engagement with the quadrature winding 29. The nubs 45 are spaced apart a distance less than the quadrature winding 29 diameter such that an interference fit exists, holding the quadrature winding in place during automated (or manual) winding and operation of the dynamoelectric machine 21. Several recesses 47 on the radially inner portion of the end cap 31 are in registration with the corresponding channels 39 on the teeth 37. The quadrature winding 29 runs through the recess 47 and is held in place by the nubs 45 disposed on opposite sides of the recess on the portion of the end cap 31 farthest from the stator 27.

The stator end cap 31 comprises polymeric material such that the nubs 45 are formed integrally with the end cap. The polymeric material also functions as an additional insulator between the stator 27, the main winding 41, and the quadrature winding 29.

The remainder of the dynamoelectric machine 21 components do not substantially deviate from prior art dynamoelectric machine components and their discussion is not essential for an understanding of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A dynamoelectric machine comprising:

a rotor including at least one permanent magnet;

a stator including a stator core having a central opening in which the rotor is received, the stator core having teeth extending radially inwardly into the central opening, and a winding wound around at least some of the teeth of the stator core;

a quadrature winding positioned for generating an output signal representative of rotor angular position, the quadrature winding including wire extending longitudinally of the stator core along radially inner ends of at least some of the stator teeth; and wire retaining means associated with at least some of the stator teeth for engaging and fixedly retaining the quadrature winding wire to secure the quadrature winding in position on the stator core;

said wire retaining means comprising a pair of nubs spaced apart a distance less than the diameter of the quadrature winding wire such that the wire is received between the nubs with an interference fit, said wire retaining means located generally at the radially inner ends of said at least some stator teeth.

2. A dynamoelectric machine as set forth in claim 1 wherein said wire retaining means is disposed at both longitudinal ends of the stator core, and is constructed to receive and fixedly retain the quadrature winding wire generally at the radially inner end of said at least some stator teeth.

3. A dynamoelectric machine as set forth in claim 2 wherein the pairs of nubs constitute first pairs of nubs, the dynamoelectric machine further comprising a second pair of nubs for each of the first pairs of nubs, each second pair of nubs being located generally adjacent radially outer ends of the teeth and in radial alignment with a corresponding one of the first pairs of nubs.

4. A dynamoelectric machine as set forth in claim 2 further comprising end caps formed of polymeric material and having teeth corresponding to the teeth of the stator core, the end caps being mounted on respective ends of the stator core, the nubs being formed integrally with the end caps.

5. A dynamoelectric machine as set forth in claim 4 wherein said at least some stator teeth each have a channel in their radially inner ends extending longitudinally of the stator core, the channels receiving the quadrature winding wire therein.

6. A dynamoelectric machine as set forth in claim 5 wherein the end cap s each have a recess in registration with a corresponding channel on one of said at least some stator teeth, the nubs being disposed on opposite sides of the recess.

7. A dynamoelectric machine as set forth in claim 6 wherein the pairs of nubs constitute first pairs of nubs, the dynamoelectric machine further comprising a second pair of nubs for each of the first pairs of nubs, each second pair of nubs being located generally adjacent radially outer ends of the teeth and in radial alignment with a corresponding one of the first pairs of nubs.

8. A stator end cap for use on a dynamoelectric machine to retain a quadrature winding employed for detecting the rotational position of a permanent magnet rotor located within a stator core of the dynamoelectric machine, the stator end cap comprising:

an outer ring portion having an outer diameter corresponding to an outer diameter of the stator core, an inner diameter and a central opening;

teeth projecting from the inner diameter of the ring portion radially inwardly into the central opening of the end cap;

wire retaining means located generally at radially inner ends of at least some of the teeth for receiving and fixedly retaining quadrature winding wire forming the quadrature winding;

said wire retaining means comprising a pair of nubs spaced apart a distance less than the diameter of the quadrature winding wire such that the wire is receivable between the nubs with an interference fit, said wire retaining means located generally at the radially inner ends of said at least some teeth.

9. A stator end cap as set forth in claim 8 wherein the pairs of nubs constitute first pairs of nubs, the dynamoelectric machine further comprising a second pair of nubs for each of the first pairs of nubs, each second pair of nubs being located generally on the ring portion adjacent radially outer ends of the teeth and in radial alignment with a corresponding one of the first pairs of nubs.

10. A stator end cap as set forth in claim 8 wherein the end cap is formed of polymeric material and the nubs are formed integrally with the end cap.

11. A stator end cap as set forth in claim 10 further comprising a recess located at the radially inner end of each of said at least some teeth, the nubs being disposed on opposite sides of the recess.

12. A stator end cap as set forth in claim 11 wherein the pairs of nubs constitute first pairs of nubs, the stator end cap further comprising a second pair of nubs for each of the first pairs of nubs, each second pair of nubs being located generally on the ring portion adjacent radially outer ends of the teeth and in radial alignment with a corresponding one of the first pairs of nubs.

* * * * *